United States Patent
Iwai et al.

(10) Patent No.: US 9,638,277 B2
(45) Date of Patent: May 2, 2017

(54) BICYCLE DISC BRAKE ROTOR

(71) Applicant: Shimano Inc., Sakai, Osaka (JP)

(72) Inventors: Toru Iwai, Osaka (JP); Makoto Souwa, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 14/822,182

(22) Filed: Aug. 10, 2015

(65) Prior Publication Data

US 2015/0345579 A1    Dec. 3, 2015

Related U.S. Application Data

(62) Division of application No. 13/339,651, filed on Dec. 29, 2011, now Pat. No. 9,234,553.

(51) Int. Cl.

| | |
|---|---|
| *F16D 65/12* | (2006.01) |
| *F16D 65/847* | (2006.01) |
| *B62L 1/00* | (2006.01) |
| *F16D 65/10* | (2006.01) |
| *F16D 55/00* | (2006.01) |
| *F16D 65/02* | (2006.01) |

(52) U.S. Cl.
CPC .......... *F16D 65/847* (2013.01); *B62L 1/005* (2013.01); *F16D 65/12* (2013.01); *F16D 65/123* (2013.01); *F16D 65/128* (2013.01); *F16D 2055/0004* (2013.01); *F16D 2065/132* (2013.01); *F16D 2065/1316* (2013.01); *F16D 2065/1332* (2013.01); *F16D 2200/003* (2013.01); *F16D 2200/0017* (2013.01)

(58) Field of Classification Search
CPC ..... F16D 2055/0004; F16D 2055/0075; F16D 65/005; F16D 65/12; F16D 65/128; F16D 65/78; F16D 65/84; F16D 65/847; F16D 2065/13; F16D 2065/1304; F16D 2065/134; F16D 2065/1332; F16D 2065/1316; F16D 2065/132; F16D 65/123; F16D 2200/0017; F16D 2200/003; B62L 1/005

USPC ............... 188/18 A, 218 XL, 264 R, 264 A, 188/264 AA

See application file for complete search history.

(56) References Cited

U.S. PATENT DOCUMENTS

| | | |
|---|---|---|
| 2,710,078 A | 6/1955 | Cardwell |
| 4,036,334 A | 7/1977 | Brown |

(Continued)

FOREIGN PATENT DOCUMENTS

| | | |
|---|---|---|
| DE | 103 34 555 A1 | 2/2005 |
| TW | 276769 I | 12/1992 |
| TW | 243427 | 3/1995 |

*Primary Examiner* — Melody Burch
(74) *Attorney, Agent, or Firm* — Global IP Counselors, LLP

(57) ABSTRACT

A bicycle disc brake rotor is provided that has a center rotational axis, and basically includes an outer portion and a cooling fin. The outer portion includes a first braking part defining a first braking surface and a second braking part defining a second braking surface. The first and second braking surfaces face in opposite axial directions. The cooling fin includes an inner portion radially offset from the first and second braking surfaces. The cooling fin further includes an attachment portion extending outwardly from the inner portion and sandwiched between the first and second braking parts. The first and second braking parts are separate and distinct individual parts from each other and from the cooling fin.

12 Claims, 9 Drawing Sheets

(56) References Cited

U.S. PATENT DOCUMENTS

| | | |
|---|---|---|
| 4,913,266 A | 4/1990 | Russell et al. |
| 5,355,039 A | 10/1994 | Couture |
| 6,386,340 B1 | 5/2002 | Milesi et al. |
| 6,443,269 B1 | 9/2002 | Rancourt |
| 6,530,457 B1 | 3/2003 | Nago et al. |
| 7,219,777 B2 | 5/2007 | Lin |
| 7,281,613 B2 | 10/2007 | Weiss |
| 2003/0178265 A1 | 9/2003 | Chen |
| 2004/0035659 A1* | 2/2004 | Pacchiana ............ C04B 35/573 188/264 R |
| 2007/0199778 A1 | 8/2007 | Lee |
| 2008/0073165 A1 | 3/2008 | Rau et al. |
| 2008/0142319 A1 | 6/2008 | Manter |
| 2008/0202867 A1 | 8/2008 | Danzer et al. |
| 2008/0289918 A1 | 11/2008 | Boike et al. |
| 2010/0258394 A1 | 10/2010 | Hanna et al. |
| 2011/0240420 A1 | 10/2011 | Souwa et al. |
| 2012/0000736 A1 | 1/2012 | Koshiyama |

\* cited by examiner

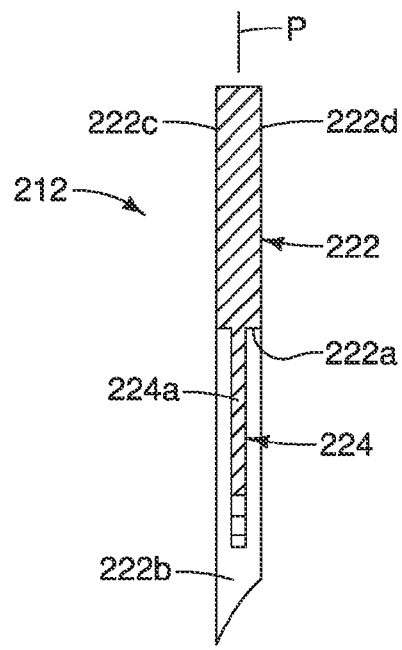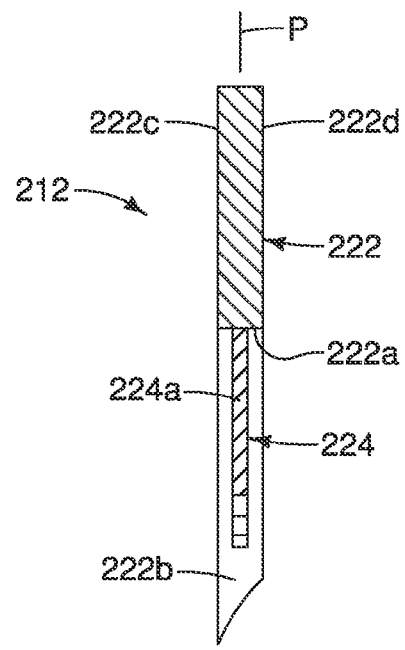
FIG. 10   FIG. 11
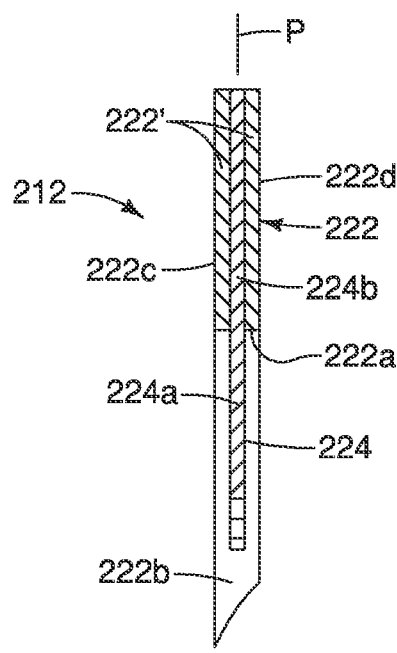
FIG. 12

BICYCLE DISC BRAKE ROTOR

CROSS-REFERENCE TO RELATED APPLICATIONS

This application is a divisional application of U.S. patent application Ser. No. 13/339,651 filed on Dec. 29, 2011. The entire disclosure of U.S. patent application Ser. No. 13/339,651 is hereby incorporated herein by reference.

BACKGROUND

Field of the Invention

This invention generally relates to a bicycle disc brake rotor. More specifically, the present invention relates to a bicycle disc brake rotor with a configuration that promotes cooling of the braking surfaces.

Background Information

In recent years, some bicycles have been provided with disc brakes. Disc brake systems provide a substantial braking power in relationship to the amount of braking force applied to the brake lever. Also, disc brake systems typically provide a high level of consistency in all types of weather and riding conditions. Disc brake systems typically include a caliper housing, a first movable brake pad and a second fixed or movable brake pad. Disc brakes can be hydraulically actuated or mechanically actuated for moving the movable brake pad(s). The brake pads are positioned on either side of a rotor, which is attached to the front or back wheel of a bicycle. The brake pads are pressed against a brake disc or rotor that is fixed to the wheel to slow down or stop the rotation of the disc, and thus, slow down or stop the rotation of the wheel.

SUMMARY

While disc brake systems provide excellent performance, the braking action tends to generate a substantial amount of heat in the disc brake rotor. Thus, one aspect present in this disclosure is to provide a disc brake rotor with a configuration that more efficiently radiates heat from the outer portion of the disc brake rotor. Another aspect present in this disclosure is to provide a disc brake rotor with a cooling fin that relatively easy to produce.

In view of the state of the known technology, a bicycle disc brake rotor is provided that has a center rotational axis, and basically comprises an outer portion and a cooling fin. The outer portion includes a first braking part defining a first braking surface and a second braking part defining a second braking surface. The first and second braking surfaces face in opposite axial directions. The cooling fin includes an inner portion radially offset from the first and second braking surfaces. The cooling fin further includes an attachment portion extending outwardly from the inner portion and sandwiched between the first and second braking parts. The first and second braking parts are separate and distinct individual parts from each other and from the cooling fin.

These and other objects, features, aspects and advantages of the disclosed bicycle disc brake rotor will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure:

FIG. 10 is a cross sectional view of the bicycle disc brake rotor illustrated in FIGS. 8 and 9 as seen along section line 10-10 of FIG. 8 with a first construction;

FIG. 11 is a cross sectional view of the bicycle disc brake rotor illustrated in FIGS. 8 and 9 with a second construction;

FIG. 12 is a cross sectional view of the bicycle disc brake rotor illustrated in FIGS. 8 and 9 with a third construction;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
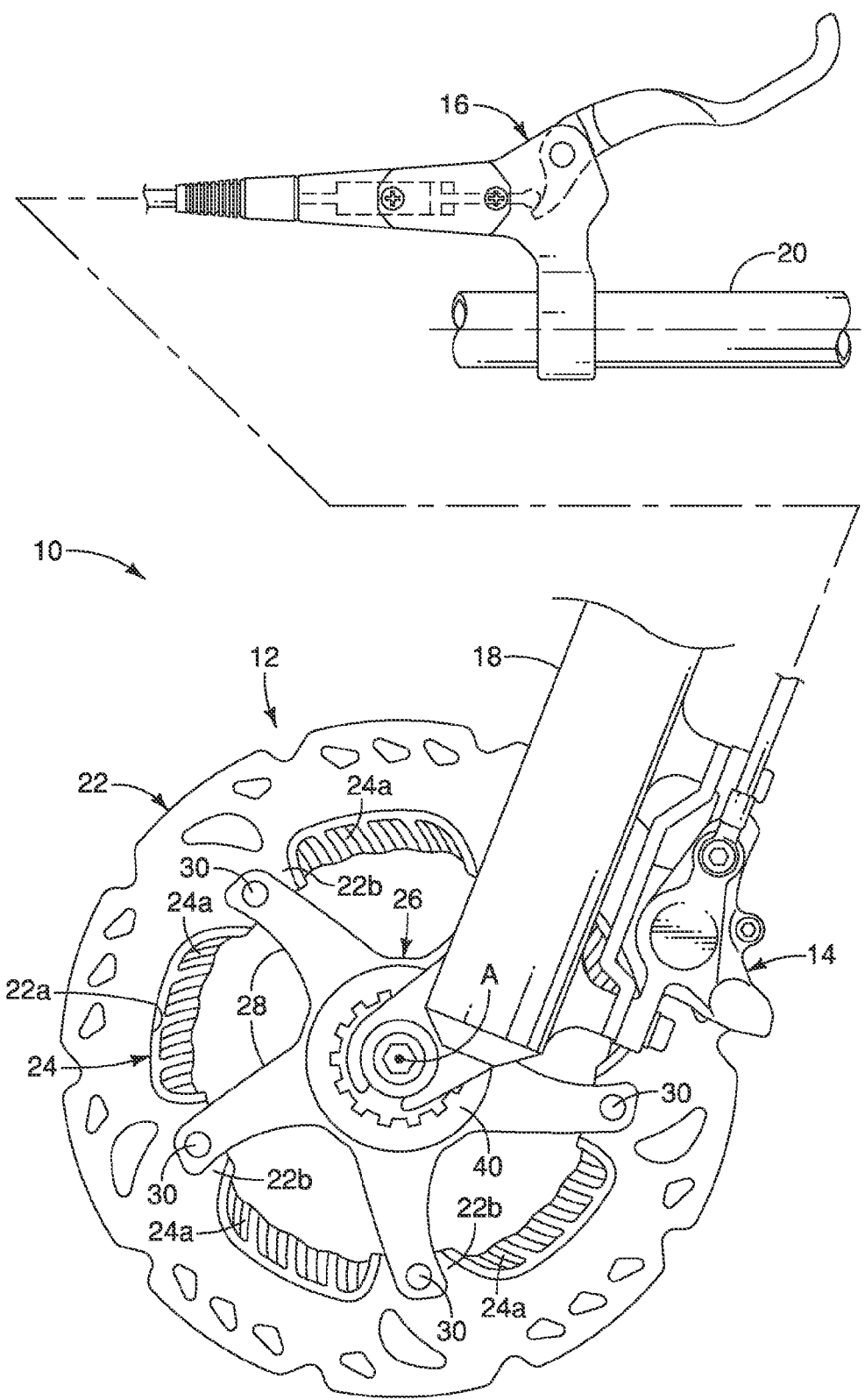
FIG. 1 is a partial side elevational view of a front disc brake system including a bicycle disc brake rotor in accordance with a first embodiment.

Referring initially to FIG. 1, a front disc brake system 10 is illustrated that includes a bicycle disc brake rotor 12 in accordance with a first embodiment. As explained below, the bicycle disc brake rotor 12 has a configuration that promotes cooling of the bicycle disc brake rotor 12. The front disc brake system 10 further includes a bicycle disc brake caliper 14 and a brake operating (actuating) mechanism 16. Basically, the bicycle disc brake rotor 12 is fixedly attached to a hub of a bicycle wheel (not shown). The bicycle disc brake caliper 14 is mounted to a bicycle fork 18, while brake operating mechanism 16 is attached to a bicycle handlebar 20. Since the operation and construction of the front disc brake system 10 is conventional, except for the construction of the bicycle disc brake rotor 12, the front disc brake system 10 will not be discussed or shown in further detail herein. Moreover, while the front disc brake system 10 is illustrated as a hydraulic braking system, the bicycle disc brake rotor 12 can be used with other types of braking systems as needed and/or desired.

The disc brake caliper 14 is constructed for selectively gripping (stopping rotation) of the bicycle disc brake rotor 12 to stop or slow the rotation of a bicycle wheel (not shown). During this braking operation, heat is generated that is transferred to the bicycle disc brake rotor 12 and the bicycle disc brake caliper 14. As explained below, the bicycle disc brake rotor 12 is designed to dissipate the heat generated during braking.

Figure 4:
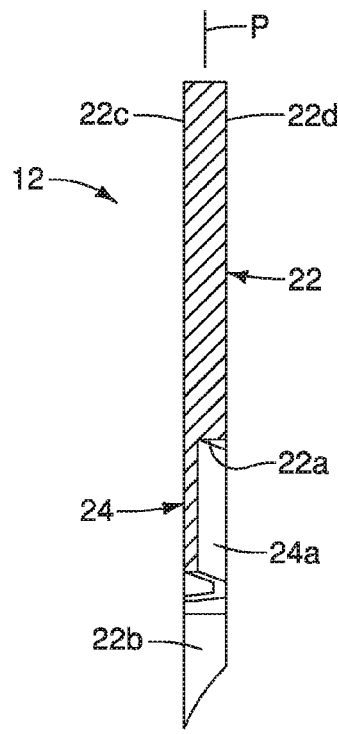
FIG. 4 is a cross sectional view of the bicycle disc brake rotor illustrated in FIGS. 1 and 2 as seen along section line 4-4 of FIG. 2 with a first construction.
Figure 5:
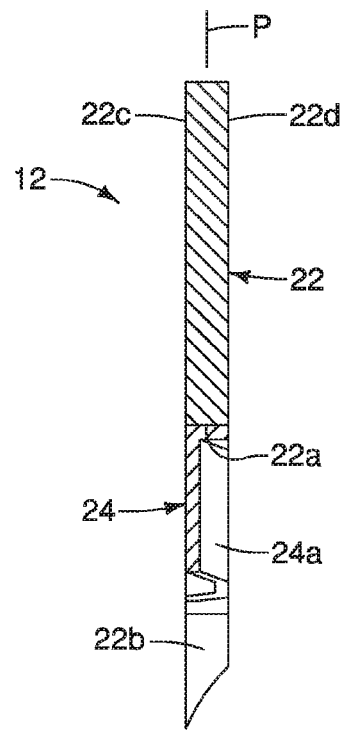
FIG. 5 is a cross sectional view, similar to FIG. 4, of the bicycle disc brake rotor illustrated in FIGS. 1 and 2 with a second construction.
Figure 6:
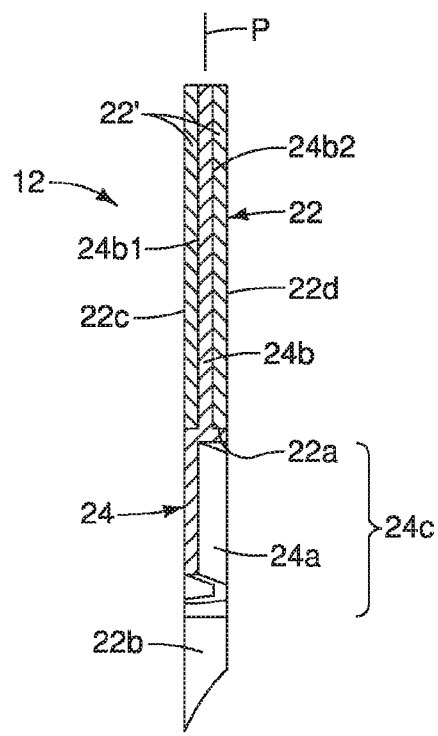
FIG. 6 is a cross sectional view, similar to FIG. 4, of the bicycle disc brake rotor illustrated in FIGS. 1 and 2 with a third construction.

Referring now to FIGS. 2 to 6, the bicycle disc brake rotor 12 includes an outer portion 22 and a cooling fin 24. The cooling fin 24 is disposed on an inner peripheral edge 22a of the outer portion 22 and extends towards a center rotational axis A of the bicycle disc brake rotor 12. The cooling fin 24 is connected to the outer portion 22 to efficiently radiate heat from the outer portion 22 of the disc brake rotor 12, In this first embodiment, the cooling fin 24 includes a plurality (five) of wavy shaped portions 24a. The wavy shaped portions 24a are annularly disposed about the center rotational axis A of the bicycle disc brake rotor 12 and circumferentially spaced apart from each other. As seen in FIGS. 4 to 6, the outer portion and the cooling fin 24 can be integrally formed as a one-piece member (FIG. 4) or separate members (FIGS. 5 and 6) that are secured (e.g. bonded by welding, brazing, etc.) together. The cooling fin 24 can be connected to the outer portion 22 in a variety of manners. For example, as seen in FIG. 5, the outer portion 22 and the cooling fin 24 can be separate members that are secured to the inner peripheral edge 22a of the outer portion 22 by a suitable bond (e.g. bonded by welding, brazing, etc.). Alternatively, as seen in FIG. 6, the outer portion 22 includes first and second braking parts 22', and the cooling fin 24 further includes an inner portion 24c and an attachment portion 24b that is sandwiched between the first and second braking parts 22'. In the illustrated embodiment, the inner portion 24c includes the wavy shaped portions 24a. The attachment portion 24b can be a single piece with each of the wavy shaped portions 24a integrally formed therewith as a one-piece member, Alternatively, the attachment portion 24b can be a several pieces (e.g., five pieces) with one of the wavy shaped portions 24a integrally formed with one of the pieces. In the illustrated embodiment, the attachment portion 24b includes a first axially surface 24b1 and a second axially facing surface 24b2, and the first and second braking parts 22' are arranged on the first and second axially facing surfaces 24b1 and 24b2 of the attachment part 24b.

By making the outer portion 22 and the cooling fin 24 as separate members that are secured together, the materials of the outer portion 22 and the cooling fin 24 can be different. Preferably, the outer portion 22 is formed of a material with corrosion resistant characteristic that is suitable for brake pad contact such as, for example, stainless steel, while the cooling fin 24 are formed of a metallic material with corrosion resistant characteristic such as aluminum alloy, stainless steel or other suitable material. Preferably, the material of the cooling fin 24 has a higher thermal conductivity than the outer portion 22.

Here in the first illustrated embodiment, the bicycle disc brake rotor 12 further includes a hub mounting portion 26 that is connected to a plurality of mounting portions 22b of the outer portion 22. A plurality of connecting arms 28 extends radially inward from the outer portion 22 to the hub mounting portion. Thus, the outer portion 22 is coupled to outer ends of the connecting arms 28 and the connecting arms 28 and the hub mounting portion 26 is coupled to inner ends of the connecting arms 28. In the first illustrated embodiment, the hub mounting portion 26 and the connecting arms 28 are integrally formed as a one-piece member of a suitable material such as aluminum alloy or other suitable lightweight material. The outer ends of the connecting arms 28 are attached to the outer portion 22 by suitable fasteners 30 (e.g., rivets). Of course, it will be apparent to those skilled in the art from this disclosure that the outer portion 22, the connecting arms 28 and the hub mounting portion 26 can be integrally formed as a one-piece member. Alternatively, the outer portion 22 and the connecting arms 28 can be integrally formed as a one-piece member that is attached to the hub mounting portion 26. Also alternatively, the connecting arms 28 can be separate pieces that are attached to both the outer portion 22 and the hub mounting portion 26 by suitable fasteners.

In the first illustrated embodiment, the mounting portions 22b of the outer portion 22 are disposed between adjacent ones of the wavy shaped portions 24a. To maximize the dissipation of the heat from the outer portion 22, it is preferably to have one of the wavy shaped portions 24a disposed between each of the mounting portions 22b and spanning the entire area therebetween. Of course, if needed and/or desired, fewer wavy shaped portions can be used. Also each of the wavy shaped portions 24a has a wavy shape with respect to a rotational plane P of the bicycle disc brake rotor 12 to increase the exposed surface area of the wavy shaped portions 24a. The wavy shape of the wavy shaped portions 24a refers to alternating crests and troughs to form a sinusoidal shape. While the sinusoidal shape is illustrated as having uniform crests and troughs, the sinusoidal shape can be irregular with different shapes for some or all of the crests and troughs. Also, in the first illustrated embodiment, each of the crests and troughs is defined by three adjoining planar surfaces. However, other configurations of the wavy shaped portions 24a are possible.

The outer portion 22 of the base rotor plate 21 has first and second base surfaces 22c and 22d that face in opposite axial directions of the bicycle disc brake rotor 12. The first and second base surfaces 22c and 22d are the outermost surfaces of the bicycle disc brake rotor 12. The first base surface 22c of the outer portion 22 forms a first braking surface, while the second base surface 22d of the outer portion 22 forms a second braking surface. In this embodiment, the outer portion 22 also has ventilation openings 27 that pass axially through the outer portion 22. The cooling fin 24 is disposed radially offset from the first and second base (braking) surfaces 22c and 22d in the illustrated embodiment. Of course, it is possible to produce a base rotor plate having an outer portion with braking surfaces with unequal radial dimensions such that the cooling fin 24 radially offset from at least one of the first and second braking surfaces. Here in the first illustrated embodiment, the outer portion 22 has a maximum thickness of about 2.4 millimeters. Preferably, the wavy shaped portions 24a are disposed entirely between the first and second base surfaces 22c and 22d of the outer portion 22 of the bicycle disc brake rotor 12 as seen in FIGS. 4 to 6.

Figures 2, 3:
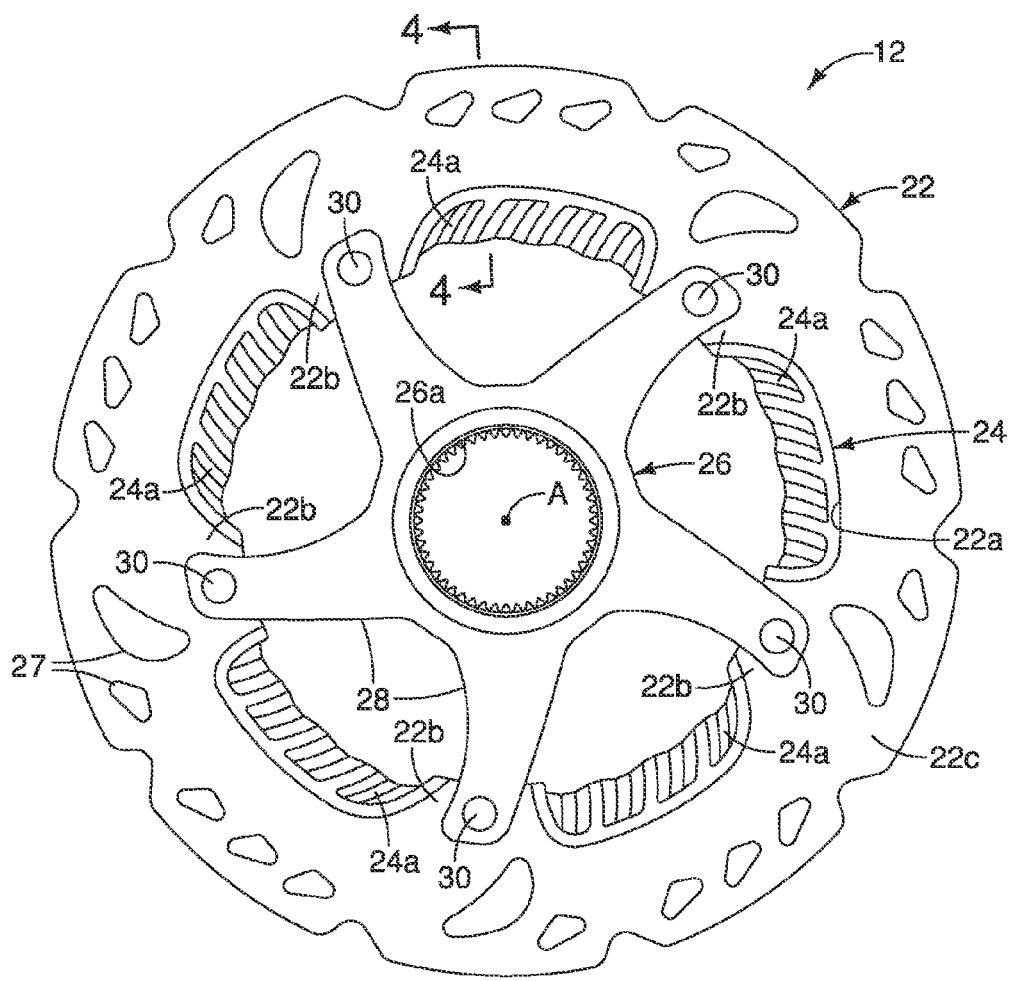
FIG. 2 is a side elevational view of the disc brake rotor illustrated in FIG. 1.
FIG. 3 is an enlarged perspective view of the bicycle disc brake rotor illustrated in FIGS. 1 and 2.

In the first illustrated embodiment, as seen in FIGS. 1 and 2, the hub mounting portion 26 is integrally formed at the inner ends of the connecting arms 28 as a one-piece member of a suitable first material such as aluminum alloy or other suitable lightweight material. The hub mounting portion 26 includes a mounting opening 26a with splines for accommodating a hub axle therethrough. The hub mounting portion 26 is mounted to a bicycle hub by a locking ring 40 as seen in FIG. 1. Thus, the bicycle disc brake rotor 12 rotates with the bicycle hub about the center rotational axis A.

Figure 7:
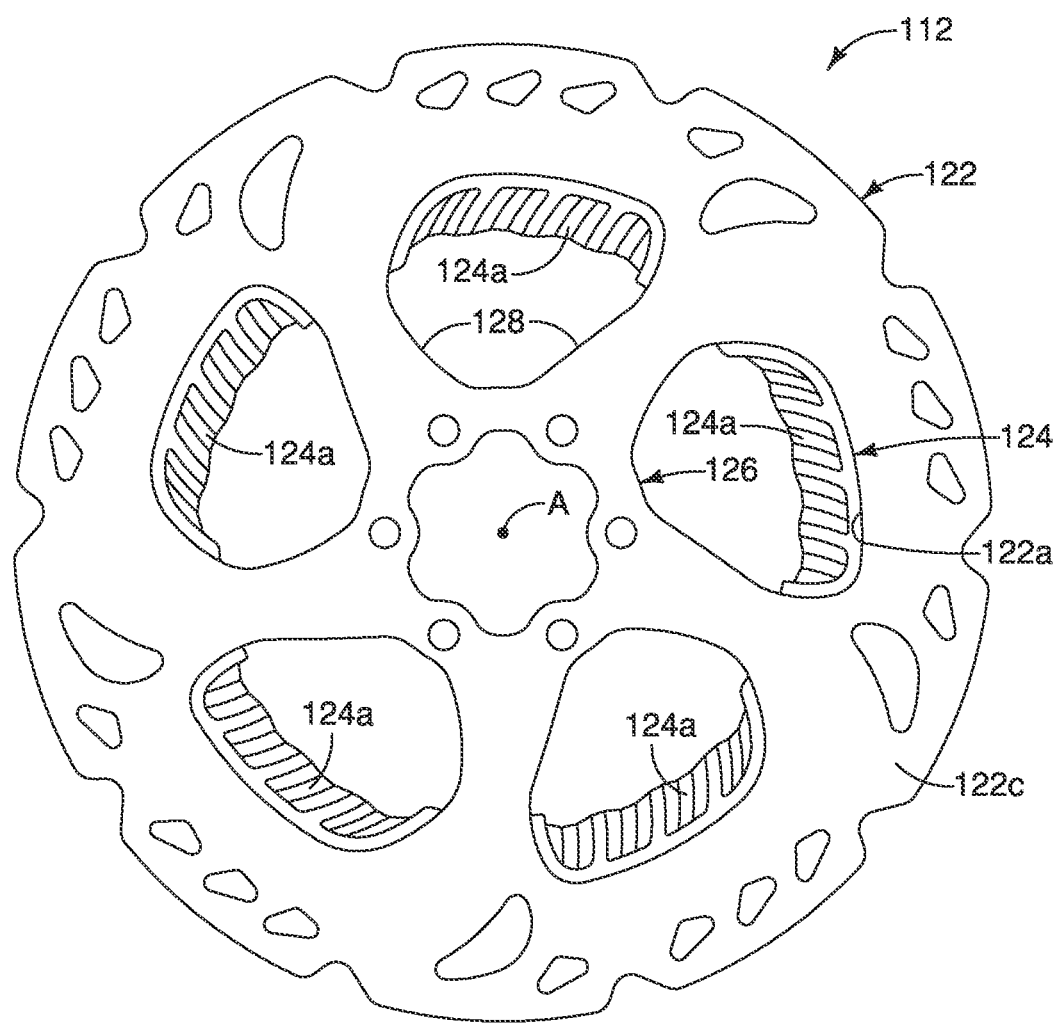
FIG. 7 is a side elevational view of a disc brake rotor in accordance with a second embodiment.
Figure 8:
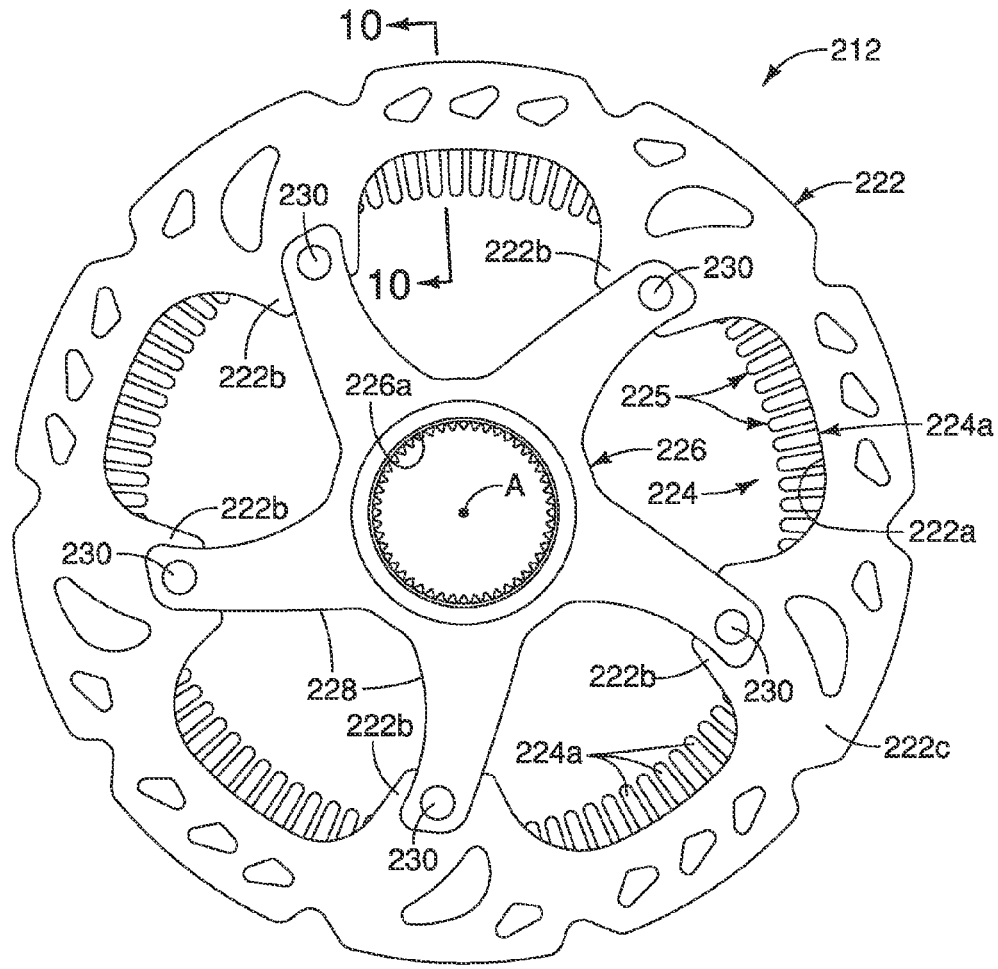
FIG. 8 is a side elevational view of a disc brake rotor in accordance with a third embodiment.

Referring now to FIG. 7, a bicycle disc brake rotor 112 is illustrated in accordance with a second embodiment. The bicycle disc brake rotor 112 includes wavy shaped outer portion 122 and a cooling fin 124 having a plurality of wavy shaped portions 124a. The cooling fin 124 is identical to the cooling fin 24. The cooling fin 124 can be either integrally armed with the outer portion 122 in the same manner as the cooling fin 24 as shown in FIG. 4, or attached to the outer portion 122 in the same manner as the cooling fin 24 as shown in FIG. 5 or 6. The bicycle disc brake rotor 112 further includes a hub mounting portion 126 and a plurality of connecting arms 128 extending radially between the outer portion 122 and the hub mounting portion 126. Basically, the bicycle disc brake rotor 112 is identical to the bicycle disc brake rotor 12, as described above, except that the outer portion 122 is integrally formed with both the hub mounting portion 126 and the connecting arms 128 in this second embodiment. Thus, the bicycle disc brake rotor 112 is a flat plate formed of a material suitable for contact with the brake pads. In view of the similarity between the first and second embodiments, further description of the second embodiment will be omitted for the sake of brevity.

Referring now to FIGS. 8 to 12, a bicycle disc brake rotor 212 is illustrated in accordance with a third embodiment. The bicycle disc brake rotor 212 includes an outer portion 222 and a cooling fin 224. The cooling fin 224 has a plurality of wavy shaped portions 224a extending radially inward from an inner peripheral edge 222a of the outer portion 222 toward the center rotational axis A of the bicycle disc brake rotor 212. The cooling fin 224 can be either integrally formed with the outer portion 222 as shown in FIG. 10, or attached to the outer portion 222 in as shown in FIG. 11 or 12. The bicycle disc brake rotor 212 further includes a hub mounting portion 226 and a plurality of connecting arms 228 extending radially between the outer portion 222 and the hub mounting portion 226. The hub mounting portion 226 is mounted to a plurality of mounting portions 223b, similar to the first embodiment. Basically, the bicycle disc brake rotor 212 is identical to the bicycle disc brake rotor 12, as described above, except that the cooling fin 224 has a different configuration in this third embodiment from the cooling fin 24 of the first embodiment. In view of the similarity between the first and third embodiments, further description of the third embodiment will be limited to the configuration of the cooling fin 224.

Figure 9:
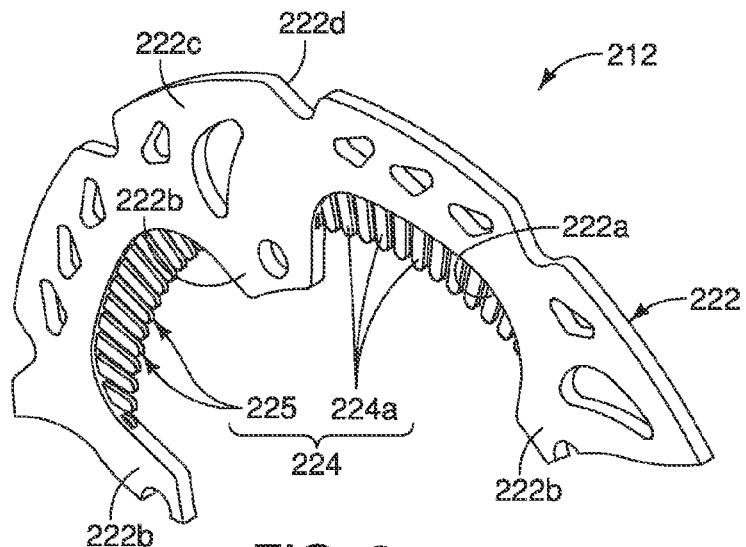
FIG. 9 is an enlarged perspective view of the bicycle disc brake rotor illustrated in FIG. 8.
Figure 13:
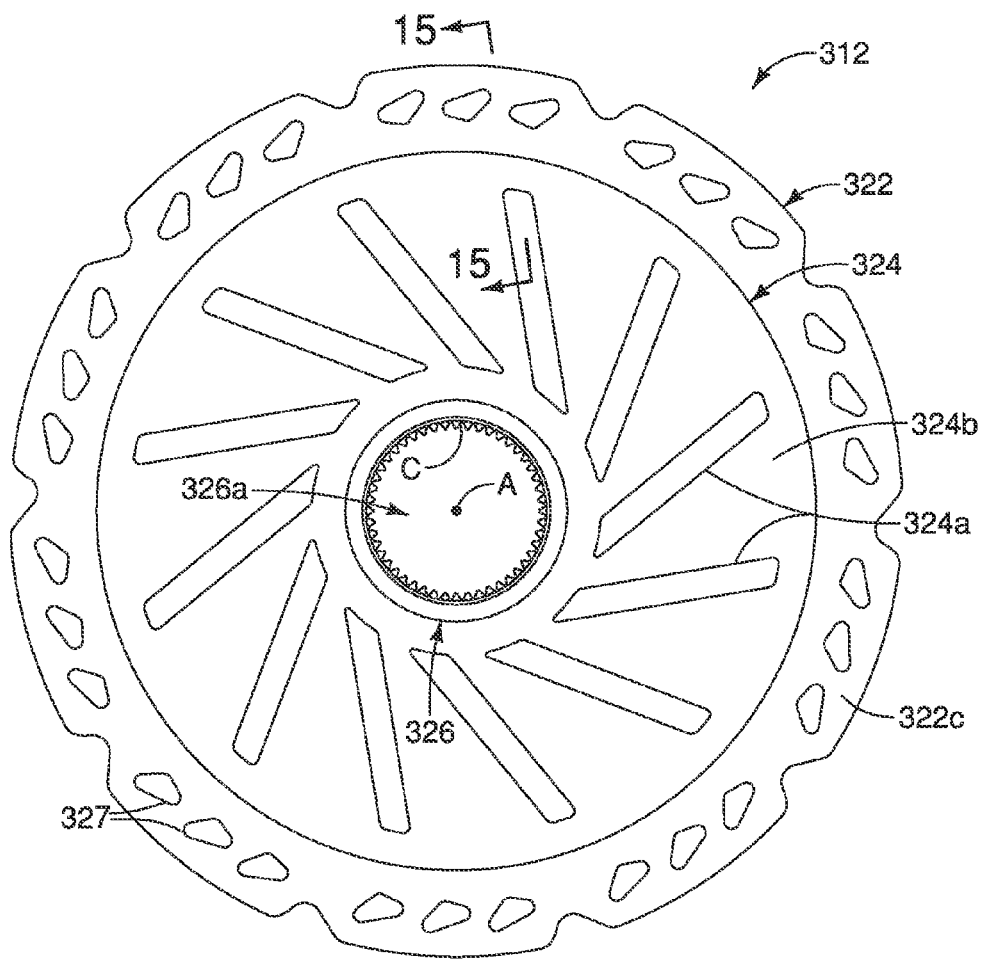
FIG. 13 is a side elevational view of a disc brake rotor in accordance with a fourth embodiment.
Figure 14:
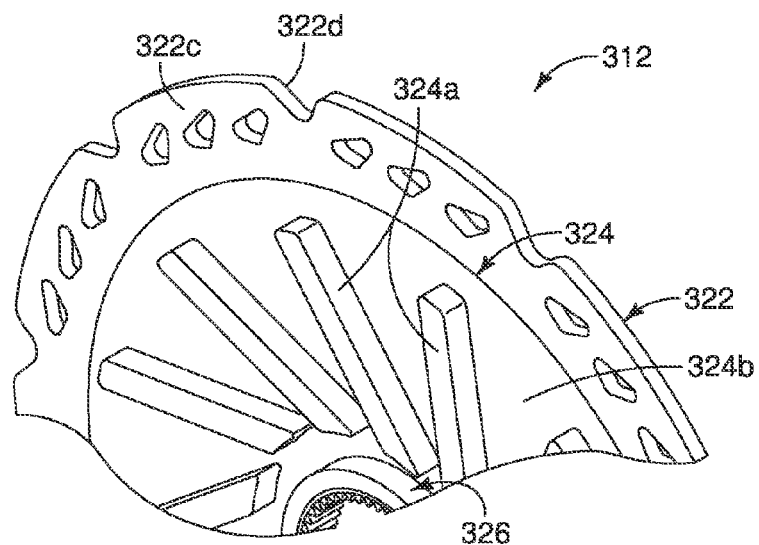
FIG. 14 is an enlarged perspective view of the bicycle disc brake rotor illustrated in FIG. 13.

Here in the third embodiment, the wavy shaped portions 224a individually extending members that extend radially inward from the inner peripheral edge 222a of the outer portion 222 toward the center rotational axis A of the bicycle disc brake rotor 212. As seen in FIG. 9, the wavy shaped portions 224a are protrusions extending radially inward towards the center rotational axis A of the bicycle disc brake rotor 212. The cooling fin 224 has a plurality slits 225 separating the wavy shaped portions 224a in the circumferential direction of the outer portion 222. The wavy shaped portions 224a (e.g., the protrusions) are illustrated as elongated plates that are cantilevered relative to the outer portion 222. The wavy shaped portions 224a has flat axially facing surfaces with flat circumferentially facing surfaces such that the wavy shaped portions 224a have a rectangular cross sectional profile in the circumferential direction. However, the wavy shaped portions 224a can have other configurations such as circular, oval, teardrop, etc. as needed and/or desired. Preferably, the wavy shaped portions 224a are disposed entirely between first and second base surfaces 222c and 222d of the outer portion 222 of the bicycle disc brake rotor 212.

As seen in FIGS. 10 to 12, the outer portion 222 and the cooling fin 224 can be integrally formed as a one-piece member (FIG. 10) or separate members (FIGS. 11 and 12) that are secured (e.g. bonded by welding, brazing, etc.) together. As seen in FIG. 11, the outer portion 222 and the cooling fin 224 can be separate members that are secured to the inner peripheral edge 222a of the outer portion 222 by a suitable bond (e.g. bonded by welding, brazing, etc.). Alternatively, as seen in FIG. 12, the outer portion 222 includes first and second braking parts 222', and the cooling fin 224 further includes an attachment portion 224b that is sandwiched between the first and second braking parts 222'. Preferably, the attachment portion 224b can be a single piece with each of the wavy shaped portions 224a integrally formed therewith as a one-piece member.

Referring now to FIGS. 13 to 17, a bicycle disc brake rotor 312 in accordance with a fourth embodiment will now be explained. Here, the bicycle disc brake rotor 312 includes an outer portion 322 and a cooling fin 324. The bicycle disc brake rotor 312 further includes a hub mounting portion 326. In this embodiment, the outer portion 322 also has ventilation openings 327 that pass axially through the outer portion 322. In view of the similarity between the fourth embodiment and the prior embodiments, further description of the fourth embodiment will be limited to the configuration of the cooling fin 324.

Figure 15:
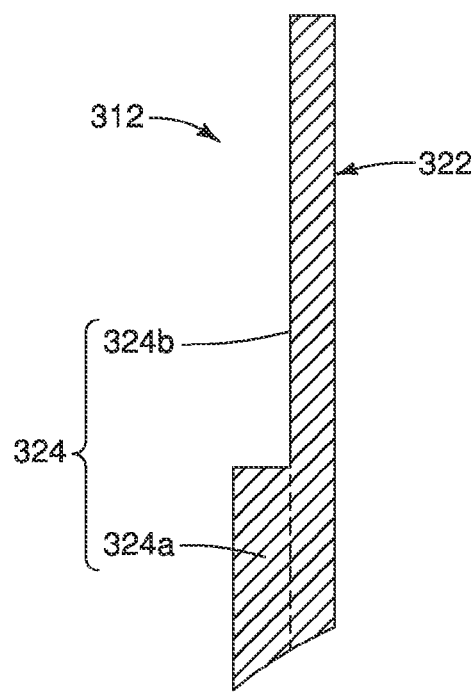
FIG. 15 is a cross sectional view of the bicycle disc brake rotor illustrated in FIGS. 12 and 13 as seen along section line 15-15 of FIG. 13 with a first construction.
Figure 16:
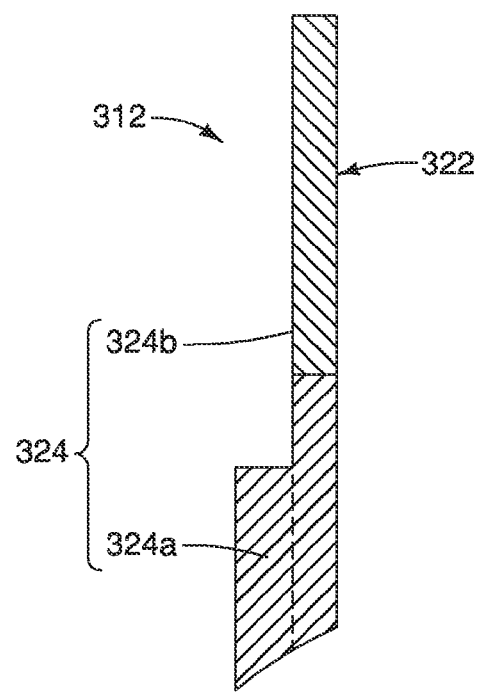
FIG. 16 is a cross sectional view of the bicycle disc brake rotor illustrated in FIGS. 12 and 13 with a second construction.
Figure 17:
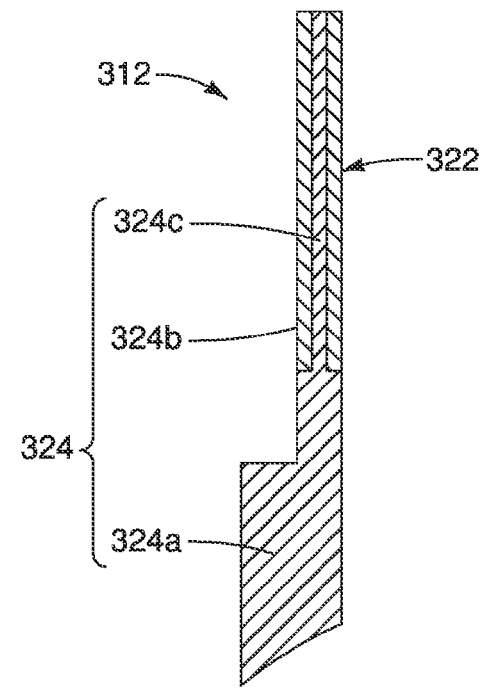
FIG. 17 is a cross sectional view of the bicycle disc brake rotor illustrated in FIGS. 12 and 13 with a third construction.

Here, the cooling fin 324 extends radially between the outer portion 322 and the hub mounting portion 326 for connecting the outer portion 322 to the hub mounting portion 326. The cooling fin 324 can be either integrally formed with the outer portion 322 as shown in FIG. 15, or attached to the outer portion 322 in as shown in FIG. 16 or 17. Preferably, as seen in FIG. 17, the outer portion 322 includes first and second braking parts 322', and the cooling fin 324 further includes an attachment portion 324c that is sandwiched between the first and second braking parts 322'. Also, the cooling fin 324 can be either integrally formed with the hub mounting portion 326 as shown in FIGS. 13 to 17, or attached to the hub mounting portion 326 by fasteners (not shown).

The cooling fin 324 includes an inner cooling portion comprising a plurality of protruding members 324a and a disc shaped portion 324b. In the fourth embodiment, the cooling fin 324 is illustrated as having a plurality of protruding members 324a. However, a single protruding member (e.g., a single spiral protruding member) can be used if needed and/or desired. Thus, the protruding members 324a constitute a protrusion of cooling fin 324. The protruding members 324a extend in an axial direction from the disc shaped portion 324b with respect to the center rotational axis A of the bicycle disc brake rotor 312. The disc shaped portion 324b constitutes an intermediate or connection portion that interconnects the outer portion 322 and the hub mounting portion 326. In the fourth embodiment, the protruding members 324a are protruding blocks that are tangentially arranged with respect to a reference circle C that is centered about the center rotational axis A of the bicycle disc brake rotor 312. The reference circle C coincides with outer periphery of the mounting opening 326a of the hub mounting portion 326. Of course, the protruding members 324a can be tangentially arranged with respect to other reference circles that are centered about the center rotational axis A as needed and/or desired.

Figure 18:
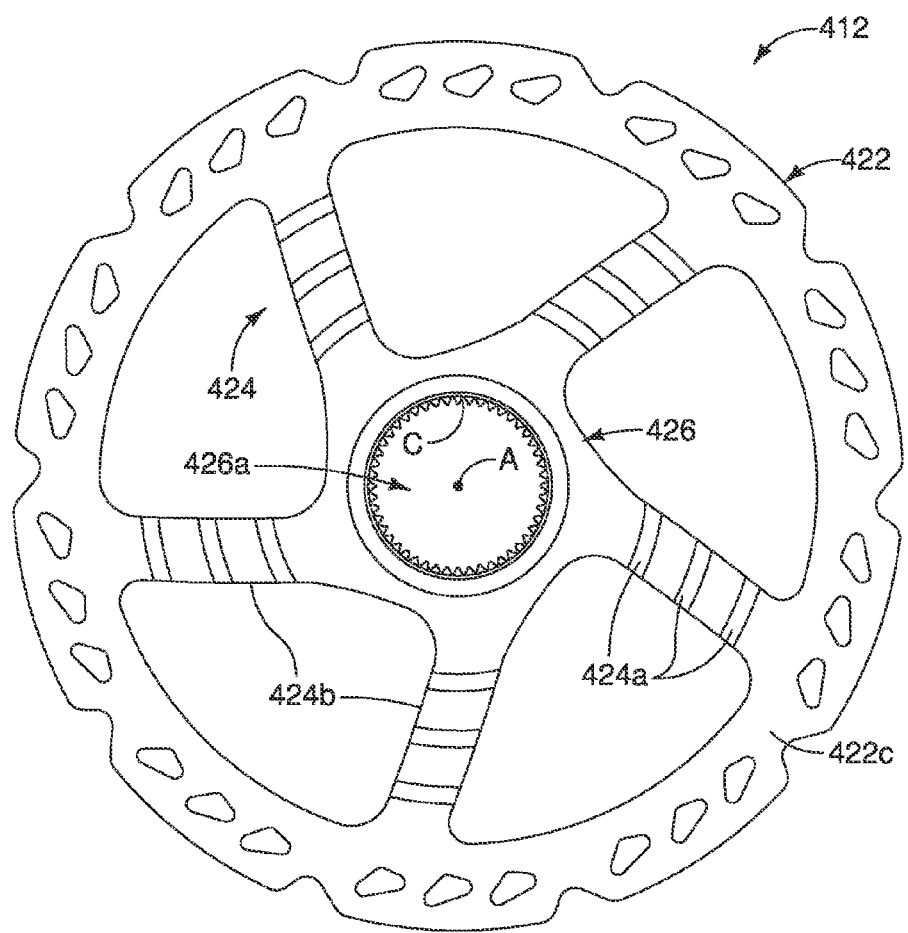
FIG. 18 is a side elevational view of a disc brake rotor in accordance with a fifth embodiment.
Figure 19:
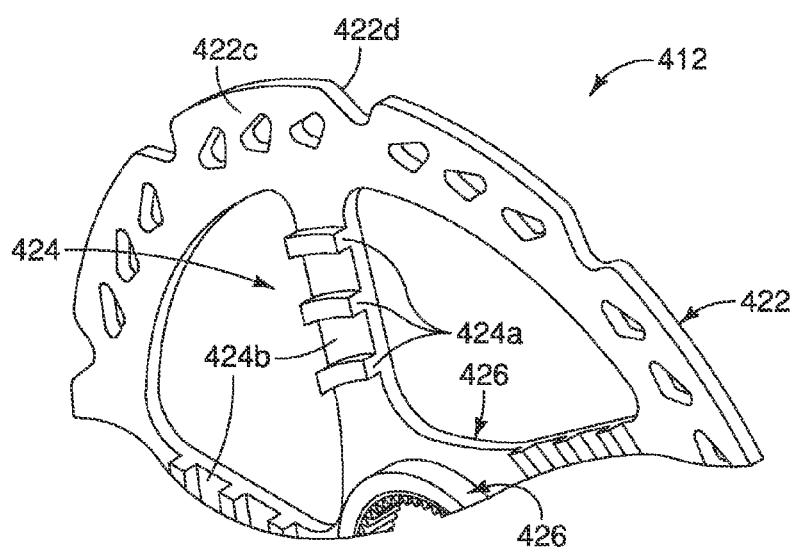
FIG. 19 is an enlarged perspective view of the bicycle disc brake rotor illustrated in FIG. 18.

Referring now to FIGS. 18 and 19, a bicycle disc brake rotor 412 in accordance with a fifth embodiment will now be explained. Here, the bicycle disc brake rotor 412 includes an outer portion 422 and a cooling fin 424. The bicycle disc brake rotor 412 further includes a hub mounting portion 426. In view of the similarity between the fifth embodiment and the prior embodiments, further description of the fifth embodiment will be limited to the configuration of the cooling fin 424.

Here, the cooling fin 424 is an intermediate arm portion that extends radially between the outer portion 422 and the hub mounting portion 426 for connecting the outer portion 422 to the hub mounting portion 426. The cooling fin 424 includes a plurality of protruding members 424*a* and a plurality of connecting arms 424*b* (i.e., the intermediate arm portion). The cooling fin 424 can be either integrally formed with the outer portion 422 and the hub mounting portion 426 as shown in FIGS. 18 and 19, or attached to the outer portion 422 similar to the first embodiment.

The connecting arms 424*b* (the intermediate arm portion) have outer ends integrally formed as a one-piece member with the outer portion 422. The connecting arms 424*b* extend radially inward from the outer portion 422 towards the center rotational axis A of the bicycle disc brake rotor 412. The connecting arms 424*b* have inner ends integrally formed as a one-piece member with the outer portion 422. The protruding members 424*a* extend in an axial direction from the connecting arms 424*b* with respect to the center rotational axis A of the bicycle disc brake rotor 412. While the protruding members 424*a* are illustrated as arc-shaped block members, the protruding members 424*a* can have other configurations. For example, the connecting arms 424*b* can each be provided with one or more linear shaped blocks that are tangentially arranged with respect to other a reference circle that is centered about the center rotational axis A.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A. bicycle disc brake rotor having a center rotational axis, the bicycle disc brake rotor comprising:
   an outer portion including a first braking part defining a first braking surface and a second braking part defining a second braking surface, the first and second braking surfaces facing in opposite axial directions, the outer portion further including at least one mounting portion that protrudes radially inwardly from the first and second braking surfaces; and
   a cooling fin including an inner portion. radially offset from the first and second braking surfaces, the cooling fin further including an attachment portion extending outwardly from the inner portion and sandwiched between the first and second braking parts, the first and second braking parts being separate and distinct individual parts from each other and from the cooling fin,
   the inner portion of the cooling fin being divided into at least two fin portions separated from each other in a circumferential direction of the bicycle disc brake rotor by the at least one mounting portion, each of the at least two fin portions being recessed in a radially outward direction of the bicycle disc brake rotor with respect to a radially innermost edge of the at least one mounting portion.

2. The bicycle disc brake rotor according to claim 1, further comprising
   a hub mounting portion configured to be mounted to a bicycle hub.

3. The bicycle disc brake rotor according to claim 2, wherein
   the inner portion of the cooling fin is disposed between the hub mounting portion and the outer portion.

4. The bicycle disc brake rotor according to claim 3, wherein
   the inner portion of the cooling fin extends radially between the hub mounting portion and the outer portion with respect to the center rotational axis.

5. The bicycle disc brake rotor according to claim 2, wherein
   the hub mounting portion includes at least one mounting opening.

6. The bicycle disc brake rotor according to claim 1, wherein
   the first and second braking parts include a plurality of ventilation openings.

7. The bicycle disc brake rotor according to claim 1, wherein
   the cooling fin is made of aluminum alloy and the first and second braking parts are made of stainless steel.

8. A bicycle disc brake rotor having a center rotational axis, the bicycle disc brake rotor comprising:
   an outer portion including a first braking part defining a first braking surface and a second braking part defining a second braking surface, the first and second braking surfaces facing in opposite axial directions of the bicycle disc brake rotor; and
   a cooling fin including an inner portion radially offset from the first and second braking surfaces, the cooling fin further including an attachment portion extending outwardly from the inner portion and sandwiched between the first and second braking parts, the first and second braking parts being separate and distinct individual parts from each other and from the cooling fin,
   the attachment portion having a first axially facing surface and a second axially facing surface, the first axially facing surface facing in an opposite axial direction from the second axially facing surface, the first braking part being disposed on the first axially facing surface, and the second braking part being disposed on the second axially facing surface, the first axially facing surface and the second axially facing surface being recessed from a radially outermost portion of the inner portion in the axial direction such that the attachment portion has a smaller dimension in the axial direction than the radially outermost portion of the inner portion.

9. The bicycle disc brake rotor according to claim 1, wherein
the first and second braking parts have outermost peripheral edges that are aligned with an outermost peripheral edge of the attachment portion.

10. The bicycle disc brake rotor according to claim 1, wherein
the cooling fin is made of a material having a higher thermal conductivity than the material of the first and second braking parts.

11. The bicycle disc brake rotor according to claim 8, wherein
the first axially facing surface and the second axially facing surface are flat.

12. The bicycle disc brake rotor according to claim 11, wherein
the first axially facing surface and the second axially facing surface are parallel to each other.

* * * * *